(12) United States Patent
Fainor et al.

(10) Patent No.: US 10,534,341 B2
(45) Date of Patent: Jan. 14, 2020

(54) SYSTEMS AND METHODS FOR OPERATING A DATA INTERCONNECTION ADAPTER

(71) Applicant: Sparta Systems, Inc., Hamilton, NJ (US)

(72) Inventors: Judith A. Fainor, Doylestown, PA (US); John D. Ament, Ewing, NJ (US); Bruce Kratz, Moorestown, NJ (US)

(73) Assignee: Sparta Systems, Inc., Hamilton, NJ (US)

( * ) Notice: Subject to any disclaimer, the term of this patent is extended or adjusted under 35 U.S.C. 154(b) by 0 days.

(21) Appl. No.: 16/279,050

(22) Filed: Feb. 19, 2019

(65) Prior Publication Data

US 2019/0179284 A1 Jun. 13, 2019

Related U.S. Application Data

(63) Continuation of application No. 14/627,071, filed on Feb. 20, 2015, now Pat. No. 10,248,096.

(Continued)

(51) Int. Cl.
*G05B 19/05* (2006.01)
*G06Q 10/06* (2012.01)
(Continued)

(52) U.S. Cl.
CPC ............. *G05B 19/05* (2013.01); *G06F 8/20* (2013.01); *G06F 16/289* (2019.01); *G06Q 10/06* (2013.01);
(Continued)

(58) Field of Classification Search
None
See application file for complete search history.

(56) References Cited

U.S. PATENT DOCUMENTS

| | | | | |
|---|---|---|---|---|
| 6,606,744 B1 * | 8/2003 | Mikurak | ................. | H04L 29/06 717/174 |
| 6,715,145 B1 * | 3/2004 | Bowman-Amuah | ..... | G06F 8/20 718/100 |
| 7,035,923 B1 * | 4/2006 | Yoakum | ................. | H04L 67/24 379/106.01 |
| 7,130,807 B1 * | 10/2006 | Mikurak | ................ | G06Q 10/06 705/7.25 |

(Continued)

*Primary Examiner* — Gurkanwaljit Singh
(74) *Attorney, Agent, or Firm* — Amardeep S. Grewal; Reed Smith LLP

(57) ABSTRACT

Methods, systems, and computer-readable media storing instructions are described for receiving, at a first adapter on a first computer system, a first Enterprise Quality Management (EQM) communication configured to pass EQM data between the first computer system and a second computer system on the computer network, transforming the EQM communication into a standardized data format, transmitting the standardized first EQM communication to a second adapter resident on a second computer system, receiving a second EQM communication comprising EQM response data from the second adapter in response to the first EQM communication, the second EQM communication being transmitted by the second adapter in the standardized data format, determine whether the second EQM communication is interpretable by the first computer system, and transforming the second EQM communication into a data format interpretable by the first computer system when the second EQM communication is not interpretable by the second computer system.

30 Claims, 8 Drawing Sheets

Related U.S. Application Data

(60) Provisional application No. 61/971,736, filed on Mar. 28, 2014.

(51) Int. Cl.
*H04L 29/08* (2006.01)
*H04L 29/06* (2006.01)
*G06F 8/20* (2018.01)
*G06Q 10/10* (2012.01)
*G06F 16/28* (2019.01)

(52) U.S. Cl.
CPC . *G06Q 10/06375* (2013.01); *G06Q 10/06395* (2013.01); *G06Q 10/10* (2013.01); *H04L 67/02* (2013.01); *H04L 67/42* (2013.01); *H04L 69/08* (2013.01); *G05B 2219/24159* (2013.01); *Y10S 707/99944* (2013.01)

(56) References Cited

U.S. PATENT DOCUMENTS

| | | | | |
|---|---|---|---|---|
| 7,330,895 | B1 * | 2/2008 | Horvitz | G06Q 10/10 455/414.1 |
| 7,870,240 | B1 * | 1/2011 | Horvitz | G06Q 10/109 709/223 |
| 8,156,232 | B2 * | 4/2012 | Callaghan | G05B 19/05 700/83 |
| 8,161,165 | B2 * | 4/2012 | Horvitz | G06Q 10/10 455/414.1 |
| 8,249,060 | B1 * | 8/2012 | Horvitz | G06Q 10/109 370/356 |
| 2005/0084082 | A1 * | 4/2005 | Horvitz | H04M 3/436 379/114.06 |
| 2007/0061018 | A1 * | 3/2007 | Callaghan | G05B 19/05 700/1 |
| 2008/0140788 | A1 * | 6/2008 | Carter | G06Q 10/107 709/206 |
| 2012/0173671 | A1 * | 7/2012 | Callaghan | G05B 19/05 709/217 |

\* cited by examiner

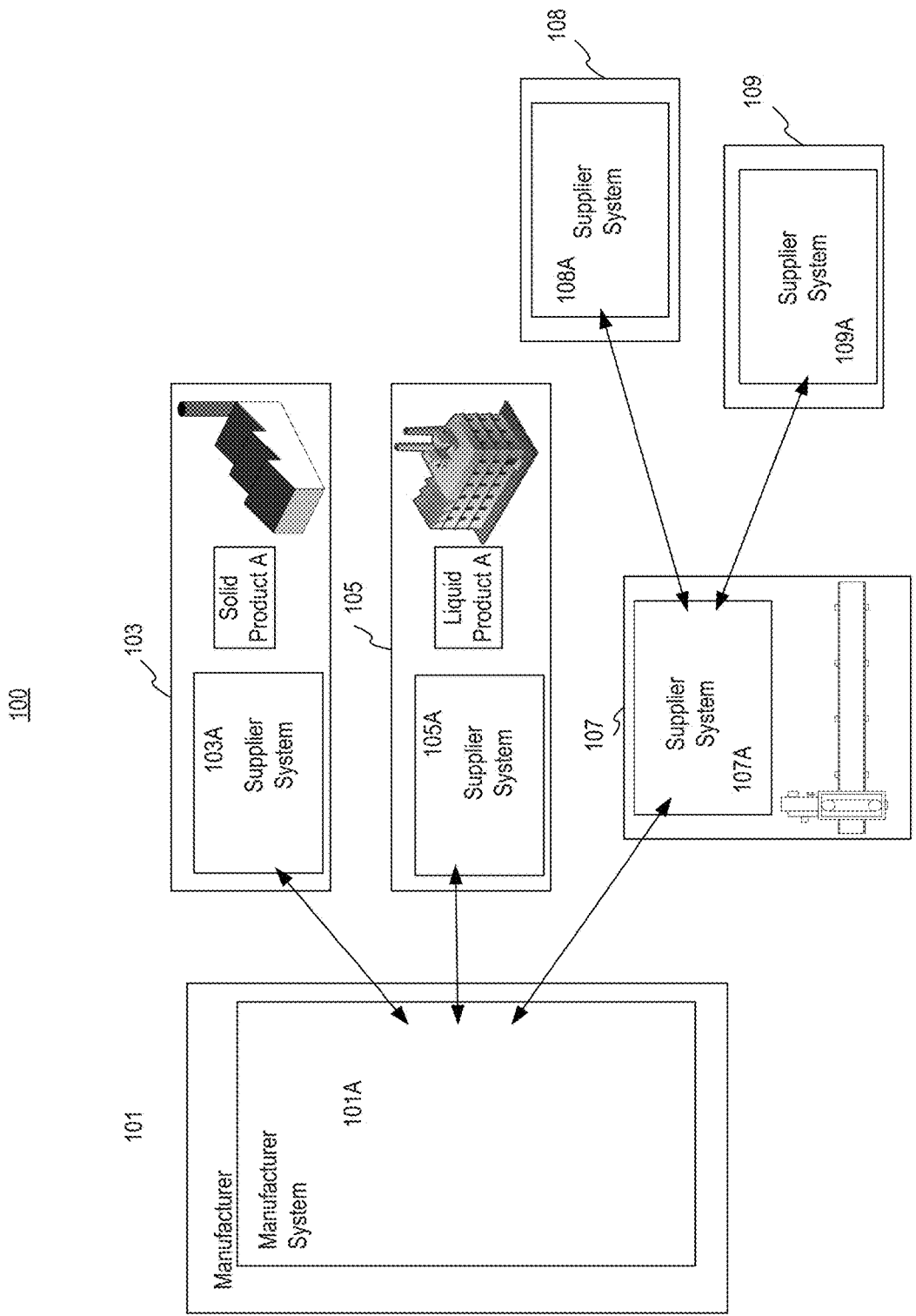

SYSTEMS AND METHODS FOR OPERATING A DATA INTERCONNECTION ADAPTER

RELATED APPLICATIONS

This application is a continuation application of U.S. Non-Provisional patent application Ser. No. 14/627,071, filed Feb. 20, 2015, which itself claims priority to U.S. Provisional Patent Application No. 61/971,736, filed Mar. 28, 2014, both of which are hereby incorporated by reference in their entirety.

FIELD

Embodiments of the present disclosure include methods, systems, and computer-readable media storing instructions for bidirectional exchange of quality data using a common protocol.

BACKGROUND

An Enterprise Quality Management System (EQMS) is a type of software usable for tracking quality issues in a variety of situations. One exemplary use case for such systems is in pharmaceutical manufacturing. Pharmaceutical manufacturers could use an on-premises EQMS to keep track of the manufacture of a particular drug or device. Each step of a process of creating that device may be accompanied by the storage or manipulation of data in the EQMS. This enables auditing, record-keeping, compliance with Federal requirements, storage of relevant documents or data, and the like.

A manufacturer may be in a business relationship with one or more suppliers that provide the manufacturer with goods, services, raw materials, or finished products. For example, if the manufacturer sells a particular drug that is made using a solid product and a liquid product, one supplier may provide a solid product, another supplier may provide a liquid product, and a third supplier may provide testing equipment for testing the potency of the final product. Each of these suppliers may utilize different EQMSes for managing their production of the materials used by the manufacturer. This can create problems. For example, if a supplier of the solid product finds that the solid product is slightly off of a specification mandated by the manufacturer, the supplier may not be able to send the measurements alerting the manufacturer of this, because both the manufacturer and the supplier use different EQMSes. The supplier may need to call or email the manufacturer with that information, which can yield incorrect information and/or slow response times. If the manufacturer can use the solid product anyway despite the defects, the supplier wastes time in trying to contact the manufacturer to relay the discrepancy information.

For similar reasons, it is difficult for both the supplier and the manufacturer to synchronize workflow information. If the manufacturer and the supplier each use different EQMSes, each of which have different workflow steps, a supplier sending information indicating what a state the supplier is at in their workflow would not necessarily make sense to the manufacturer.

Embodiments of the present disclosure solve these problems as well as others.

SUMMARY OF THE DISCLOSED EMBODIMENTS

In accordance with the disclosed embodiments, an exemplary method for data interchange is provided. The exemplary method comprises generating, at a first party computer system, a connection request communication including data relating to a project between the first party and a second party and sending the connection request communication to a second party computer system. The method further comprises receiving, from the second party computer system, a registration change communication comprising the data relating to the project, sending a record communication including a quality object associated with the project to the second party computer system, and sending an update communication updating information in the quality object, the update communication being one of a state changing communication or a non-state changing communication. The connection request communication, the record communication, and the update communication are sent in a first format that the second party computer system cannot interpret without reformatting.

Also provided is an exemplary computer system. The computer system comprises at least one electronic processor and memory. The memory stores instructions that, when executed by the at least one electronic processor, cause the at least one electronic processor to perform the above exemplary method.

Also provided is an exemplary non-transitory computer-readable storage medium. The storage medium comprises instructions that, when executed by at least one electronic processor, cause the at least one electronic processor to perform the above exemplary method.

Suppliers and manufacturers (or other entities in other types of business relationships) may each use different EQMSes to manage respective workflows for a project that both parties are working together to accomplish. While the embodiments above are described in terms of pharmaceutical production, companies in other industries, like construction, automotive manufacturing, computer assembly, or medical device production, could take advantage of the embodiments of the present disclosure. Systems in these industries can send "quality information"—e.g., information related to the project that various parties are working together on—using a standardized format (referred to as "QDX" or "Quality Data eXchange"). This information could be in the form of, for example, XML or JSON. Without limiting the scope of this disclosure, embodiments of the disclosure generally relate to systems, methods, and computer-readable media for receiving quality information in one or more forms (e.g., in the QDX format, in a proprietary format, or in another format), determining whether or not to convert the quality information, and sending the quality information to another system, which may convert it or use it as it is in advancing a workflow or performing other actions. Embodiments include adapters usable to convert between QDX and other formats, an interconnection system that converts between formats, and systems and methods for interpreting received quality information.

Embodiments of the present disclosure provide for a common format for interacting systems, thus eliminating the need for a sending system (or "owning system") to pre-determine which quality elements and in which format the target system requires to complete the required functions. A receiving system (or "target system") can receive quality elements in a normalized format, and, using embodiments of this disclosure, make use of the required elements in the format appropriate for the system. This normalized representation of quality data can eliminate some of the guess work or misinterpretation on behalf of the sending and/or receiving systems and the transformations that are required for it be utilized in receiving system.

It is to be understood that both the foregoing general description and the following detailed description are exemplary and explanatory only and are not restrictive of the claims.

The accompanying drawings, which are incorporated in and constitute a part of this specification, illustrate several features and together with the description, serve to explain the principles and variations of the disclosed embodiments.

BRIEF DESCRIPTION OF THE DRAWINGS

FIG. 1A illustrates an exemplary information flow between a manufacturer system and supplier systems associated with the manufacturer system, consistent with disclosed embodiments.

DESCRIPTION OF THE EMBODIMENTS

Figure 1B:
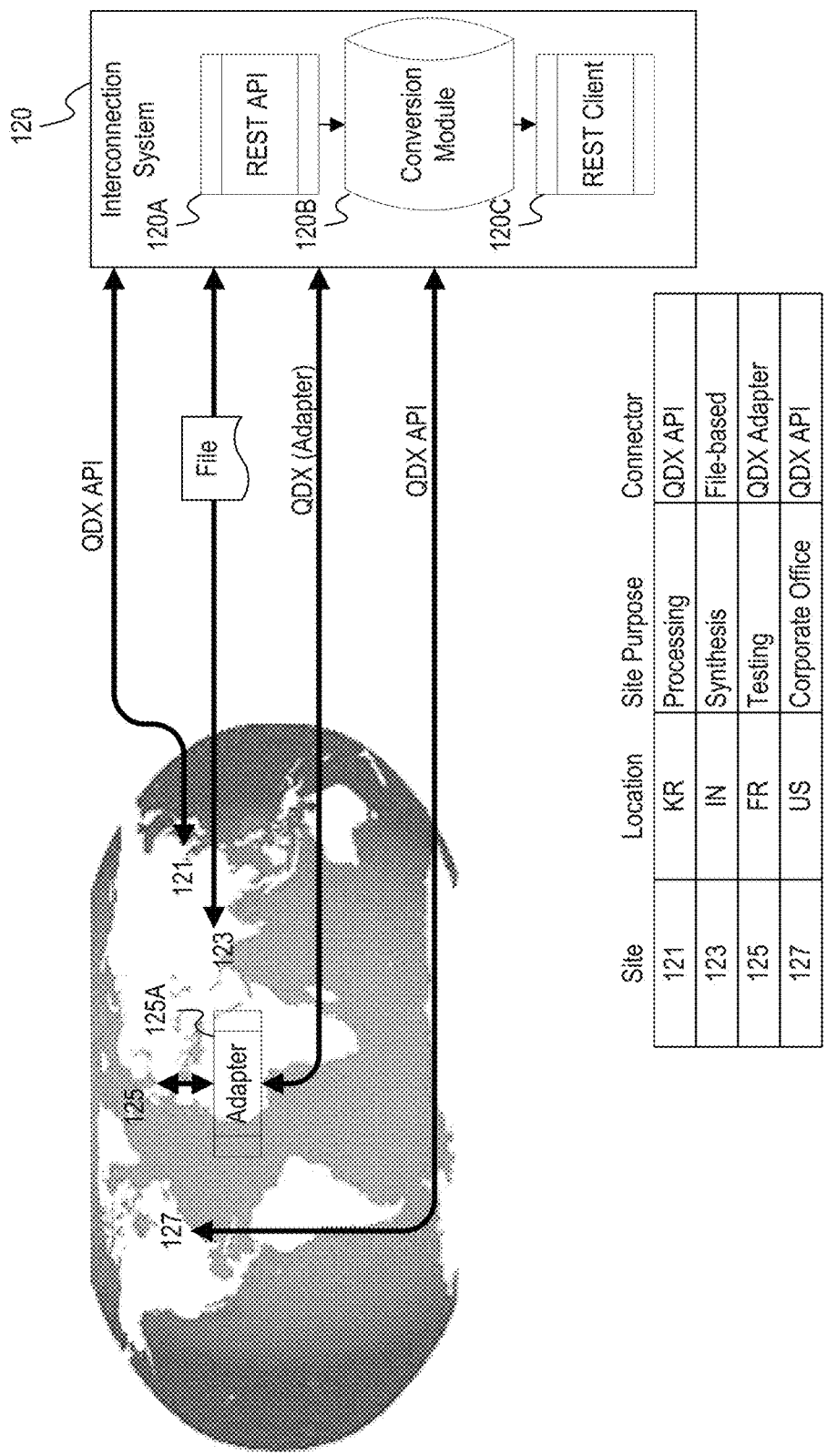
FIG. 1B illustrates an exemplary embodiment of EQMSes in communication with one another through an interconnection system, consistent with disclosed embodiments.

Wherever possible, the same reference numbers will be used throughout the drawings to refer to the same or like parts.

FIG. 1A illustrates an exemplary information flow between a manufacturer system 101A and supplier systems 103A, 105A, 107A, 108A, and 109A associated with the manufacturer system, consistent with disclosed embodiments.

An exemplary implementation of the systems in FIG. 1 could be, for example, a pharmaceutical manufacturer (101) that receives raw materials, end products, testing materials, or the like, from suppliers (103, 105). These suppliers in turn may receive raw materials, end products, testing materials, or the like, from other suppliers (108, 109).

Manufacturer system 101A may be implemented as an EQMS. Manufacturer system 101 may be implemented as a computer system that receives communications from supplier systems 103A, 105A, 107A, 108A, and 109A over a network such as the Internet. The communications may include data related to a workflow. Steps in the workflow may represent steps taken by either of the manufacturer or one or more respective suppliers.

As an illustrative example, manufacturer 101 may be a pharmaceutical manufacturer that produces a drug using solid product A from supplier 103, liquid product B from supplier 105, and testing kit C from supplier 107. Testing kit C comprises product D from supplier 108 and product E from supplier 109. Manufacturer 101 may determine that, in order to use solid product A in the manufacture of the drug, solid product A must be in powder form and that 90% of the powder granules must be between 0.003 and 0.007 μm. Supplier 103 may produce solid product A and send it to manufacturer 101 for synthesis. Supplier 103 may also send a communication to manufacturer 101 indicating that 91.572% of the granules fall within the required size range of 0.003 and 0.007 μm. For example, supplier 103 may send test data indicating how many samples of solid product A were taken and the size distribution associated with solid product A. Manufacturer 101 may receive the data and rely on it in using solid product A to create the drug.

In some embodiments, manufacturer system 101A may be configured to receive data from supplier systems 103, 105, and 107 in a variety of forms. For example, manufacturer system 101A may be programmed to only receive quality information in a single format, such as the QDX format defined in part by the messages illustrated in FIG. 2. In these embodiments, supplier systems 103A, 105A, and 107A send quality information in the QDX format so as to enable manufacturer system 101A to receive and interpret the data. In other embodiments, one or more of supplier systems 103A, 105A, or 107A may send quality information in a form other than the QDX format. Manufacturer system 101A may be configured to receive quality information from supplier systems 103A, 105A, or 107A through an adapter or connector configured to receive quality information in one format and convert it into the QDX format, such that the quality information can be understood by software operating on manufacturer system 101.

FIG. 1B illustrates an exemplary embodiment of EQMSes 121, 123, 125, and 127 in communication with one another through an interconnection system 120, consistent with disclosed embodiments.

In this illustrative embodiment, each of EQMSes 121, 123, 125, and 127 are operated by different divisions of the same company, each of which participates in the manufacture of a particular item. In the provided example, EQMS 121 located in South Korea is part of the "Processing" division of the company, EQMS 123 located in India is part of the "Synthesis" division of the company, EQMS 125 located in France is part of the "Testing" division of the company, and EQMS located in the United States is part of the main corporate office of the company.

Interconnection system 120 includes read module 120A, storage module 120B, and publish module 120C. Interconnection system 120 is configured to receive asynchronous communications to or from EQMSes 121, 123, 125, and 127 (which include, for example, quality information). In some embodiments, an EQMS or a QDX Adapter (such as QDX Adapter 125A) associated with an owning system (e.g., one of EQMSes 121, 123, 125, or 127 that sends a communication) determines whether or not to convert the received communications into another format (e.g., the QDX format), and based on the determination, convert the received communications and/or forward the communications to one or more EQMSes. Publish module 120C is notified by EQMSes 121, 123, 125, or 127 over a network that new data must be distributed. Publish module 120C may write that data to storage module 120B. Read module 120A reads pending data from storage module 120B and updates one or more of EQMSes 121, 123, 125, or 127 over a network such as the Internet. For example, one or more of EQMSes 121, 123, 125, or 127 may "subscribe" to publish module 120C. Publish module 120C may, upon receiving a communication from storage module 120B or read module 120A, notify one or more EQMSes that have subscribed to interconnection system 120 to inform those EQMSes that a communication is available for retrieval by those EQMSes. Publish module 120C may react to a notification from the EQMSes to do something, such as generating and storing a QDXRecord message 205 within storage module 120B. Periodically, read module 120A may search for these messages and update its own EQMS.

In some embodiments, publish module 120C and read module 120A may either be embedded within an EQMS, or embedded together within some kind of adaptor or connector component. EQMSes that are subscribed to interconnection system 120 may then request the communications from publish module 120C. In some embodiments, this subscription and publication process may be implemented by sending HTTP requests between one of EQMSes 121, 123, 125, or 127, and interconnection system 120, for example, using SOAP (Single Object Access Protocol) techniques.

Each of EQMSes 121, 123, 125, and 127 utilize different EQMS software, each of which may implements a different workflow with different workflow states for keeping track of processes. In this illustrative embodiment, EQMSes 121 and 127 utilize the QDX format natively. An EQMS uses the QDX format "natively" if the EQMS can receive a message in QDX format and interpret it without converting it to a different format. So, if EQMSes 121 or 127 receive a message in the QDX format from interconnection system 120, quality information in the message is interpreted by the EQMS without conversion to an intermediate format. In some embodiments, EQMS 121 or 127 can effect sending of a QDX message by utilizing an Application Programming Interface (API) installed on the EQMS. The API may be programmed to generate QDX-compliant messages and send them to interconnection system 120 for forwarding to one or more other EQMSes.

Exemplary EQMS 123 utilizes a file-based communication system, such that communications to and from EQMS 123 are accomplished using files. For example, a message or set of messages may be saved on a storage device by a connector or adapter component. Configuration parameters for a target system's connector and/or QDX Adapter would indicate the location to which QDX-formatted files would be written to or read from. When performing message consumption, the target system's connector or QDX Adapter would read the saved files that are in QDX format and convert, if necessary, to a format used by the consuming system. This conversion enables the use of native system APIs at the consuming system, utilities for importing the data in the saved files, or the like.

Exemplary EQMS 125 does not natively utilize the QDX format. EQMS 125, in some embodiments, includes a QDX adapter 125A. In some embodiments, the QDX adapter may be implemented as software (but other embodiments, including hardware, firmware, or a combination thereof, are also possible), to convert between a QDX-formatted message received from interconnection system 120 and the format used by EQMS 125. When sending quality information from EQMS 125 to one or more other EQMSes, EQMS 125 may initiate the sending of a communication including quality information in a format used by EQMS 125, and adapted 125A may convert it to QDX and forward it to the QDX adapter interconnection system 120.

Figure 2:
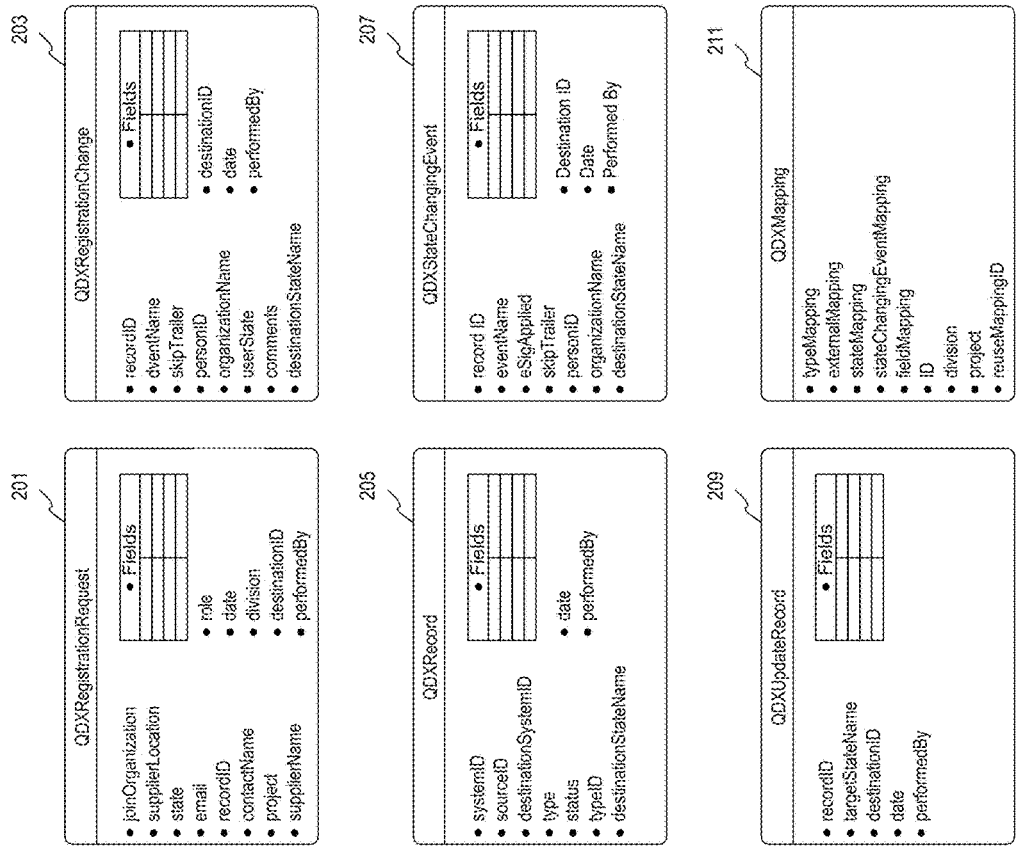
FIG. 2 illustrates exemplary messages for use in communicating between quality systems, consistent with disclosed embodiments.

FIG. 2 illustrates exemplary messages 201-209 for use in communicating between quality systems, consistent with disclosed embodiments. The exemplary messages include a QDXRegistrationRequest message 201, a QDXRegistrationChange message 203, a QDXRecord message 205, a QDXStateChangingEvent message 207, and a QDXUpdateRecord message 209. In some embodiments, one or more of these messages may be implemented in XML, but other forms are possible as well (e.g., HTML, JSON, Atom, or any other data interchange format). Each message may be duplicated, combined, eliminated, modified, or the like, depending on particular implementations of the disclosed embodiments.

Each of messages 201-209 contains multiple data elements used to communicate data between quality systems. The data elements illustrated in exemplary messages 201-209 may vary based on particular requirements, and may be duplicated, consolidated, eliminated, modified, or the like, depending on particular implementations of the disclosed embodiments.

The data elements of each message in FIG. 2 are explained below with reference to a manufacturer-supplier relationship, but this explanation is not intended to limit the scope of the disclosure. One of ordinary skill would be able to understand how to modify and/or use the messages in FIG. 2 to implement communications between entities in other types of relationships.

QDXRegistrationRequest message 201, in some embodiments, is used to initialize a connection between two EQMSes. For example, manufacturer system 101A can send a QDXRegistrationRequest message 201 to each of its supplier systems 103A, 105A, and 107A, in order to initialize the relationship between each system. QDXRegistrationRequest message 201 may include data elements such as joinOrganization (representing an identifier for the manufacturer and/or supplier), supplierLocation (indicating a physical location for a supplier), state (indicating the state of the relationship), email (a valid contact point for issues related to the manufacturer-supplier relationship), recordID (a unique token or identifier for the relationship between the EQMSes), contactName (a valid contact point for issues related to the relationship), project (a title associated with the relationship, such as "Drug X—PharmaCo-Supplier A, Inc."), supplierName (identifying the supplier by name), role (identifying a role in the relationship an end user can participate in, such as primary or supporting), division (optionally identifying a project category within any of the relevant EQMSes), destinationID (a unique identifier for a record in the receiving EQMS), date (a current time and/or date), and performedBy (identifying a person that initiated the QDXRegistrationRequest). QDXRegistrationRequest message 201 may also contain fields represented by one or more "name-value" pairs. Each name-value pair includes a name related to the field (e.g., "desiredSize") and a value corresponding to the named field (e.g., "600 μm"). The fields in QDXRegistrationRequest message 201 represent data that is to be communicated between the EQMSes as part of initializing the connection between the EQMSes.

QDXRegistrationChange message 203, in some embodiments, is used to modify the relationship between each EQMS or indicate a change in the relationship between each EQMS. For example, if manufacturer system 101A sends a QDXRegistrationRequest message 201 to supplier system 103A, supplier system 103A may send a QDXRegistrationChange message 203 indicating the result of the received QDXRegistrationRequest message 201. QDXRegistrationChange message 203 may include data elements such as recordID (a unique token or identifier for the relationship between the EQMSes, which may be identical to the one received in a previous QDXRegistrationRequest communication), eventName (indicates the action to perform in the receiving EQMS), skipTrailer (which indicates whether a summary, including an identification of the person performing the action, should be appended to the action, and defaults to "false"), personID (unique ID in the source EQMS for the person performing the action; that person need have an associated record in each EQMS), organizationName (a name of the company performing the action), comments (optional additional comments that can be applied), destinationStateName (indicating a state on a workflow that the receiving system should change to), destinationID (a unique identifier for a record in the receiving EQMS), date (a current time and/or date), and performedBy (identifying a person or device that initiated the QDXRegistrationChange message). QDXRegistrationChange message 203 may also contain fields, represented by one or more "name-value" pairs. The fields in QDXRegistrationChange message 203 may be used to represent data communicated between two or more EQMSes as part of initializing a connection between those EQMSes.

QDXRecord message 205, in some embodiments, is used to communicate quality information between EQMSes located at different systems. As explained above, quality information includes, for example, information related to a project that one or more entities collaborate on and/or the respective workflows maintained by each entity. For example, if supplier system 105A wishes to send information to manufacturer system 101A related to the production of liquid product B (such as its viscosity), supplier system 105A may generate a QDXRecord message 205 which includes a variety of data elements related the production of that liquid product B. QDXRecord message 205 may include data elements such as systemID (representing the system that generated and sent QDXRecord message 205), sourceID (representing a unique identifier at another EQMS for a record being sent to that other EQMS), destinationSystemID (a unique identifier for the EQMS receiving the record), type (representing the type of the record being sent, as understood in the receiving system), status (representing a state that the record should be put into when received), typeID (representing an alternate identifier for the type; in some embodiments this may be a type identifier from the source system), destinationStateName (indicating a state on a workflow that the receiving system should change to), date (a current time and/or date), and performedBy (identifying a person or device that initiated the QDXRecord message). QDXRecord message 205 may also contain fields, represented by one or more "name-value" pairs. The fields in QDXRecord 205 may be used to represent data communicated between EQMSes. Continuing the above example, if supplier 105 wants to communicate information about liquid product B, supplier system 105A may generate name-value pairs such as: {productName, "liquid product B"}; {viscosityValue, 1.04}; {viscosityUnits, "Pa·s"}; {productionDate, "19-11-2014"}; and {purityRate, "99.95%"}.

QDXStateChangingEvent message 207, in some embodiments, is used to communicate updates to an earlier-sent QDXRecord 205. A QDXStateChangingEvent message 207 also includes an indication that the state of the workflow at each EQMS. For example, manufacturing system 101A can send a QDXStateChangingEvent message 207 to supplier system 105A, requesting that supplier 105 begin producing liquid product B based on the viscosity values in a QDXRecord message 205 sent by supplier system 105A. The QDXStateChangingEvent message 207 could include a request by manufacturer system 101A that supplier system 105A advance its workflow from a "pre-production" state to a "production" state.

QDXStateChangingEvent message 207 may include data elements such as recordID (a unique token or identifier for the relationship between the EQMSes, which may be identical to the one received in a previous communication such as a QDXRegistrationRequest message 201), eventName (representing a name of the action performed in the source system), eSigApplied (indicating whether the record has been electronically signed), skipTrailer (which indicates whether a summary, including an identification of the person performing the action, should be appended to the action, and defaults to "false"), personID (a unique identifier for the person performing the action), organizationName (a name of the organization performing the action), destinationStateName (indicating the state that the receiving entity should change to on its workflow), destinationID (a unique identifier for a record in the receiving EQMS), date (the current time and/or date), and performedBy (identifying the person or device that initiated the QDXStateChangingEvent). QDXStateChangingEvent 207 may also contain fields, represented by one or more "name-value" pairs. The fields in QDXStateChangingEvent 207 represent data that is to be communicated between the EQMSes as part of communicating the changes to the earlier-sent QDXRecord 205.

QDXUpdateRecord message 209 is similar to QDXStateChangingEvent message 207. However, in some embodiments, a QDXUpdateRecord message 209 is not used to indicate that a workflow on the receiving EQMS should change. Instead, QDXUpdateRecord message 209 is used to update the earlier-sent QDXRecord message. QDXUpdateRecord message 209 may include data elements such as recordID (a unique token or identifier for the relationship between the EQMSes, which may be identical to the one received in a previous QDXRegistrationRequest message 201), targetStateName (indicating a state value that a workflow at the receiving EQMS should be at in order to process the QDXUpdateRecord), destinationID (a unique identifier for the receiving system), date (current time and/or date), and performedBy (identifying a person or device that initiated the QDXUpdateRecord message 209). QDXUpdateRecord message 209 may also contain fields, represented by one or more "name-value" pairs. The fields in QDXUpdateRecord message 209 represent data that is to be communicated between the EQMSes as part of communicating the changes to an earlier-sent QDXRecord message 205.

The QDX format, in some embodiments, includes other messages that are not illustrated in FIG. 2. For example, a QDXUserChangeEvent message can be generated in order to enable an EQMS to inform another EQMS of a change in management and/or persons responsible for the relationship between the EQMSes.

Figure 3:
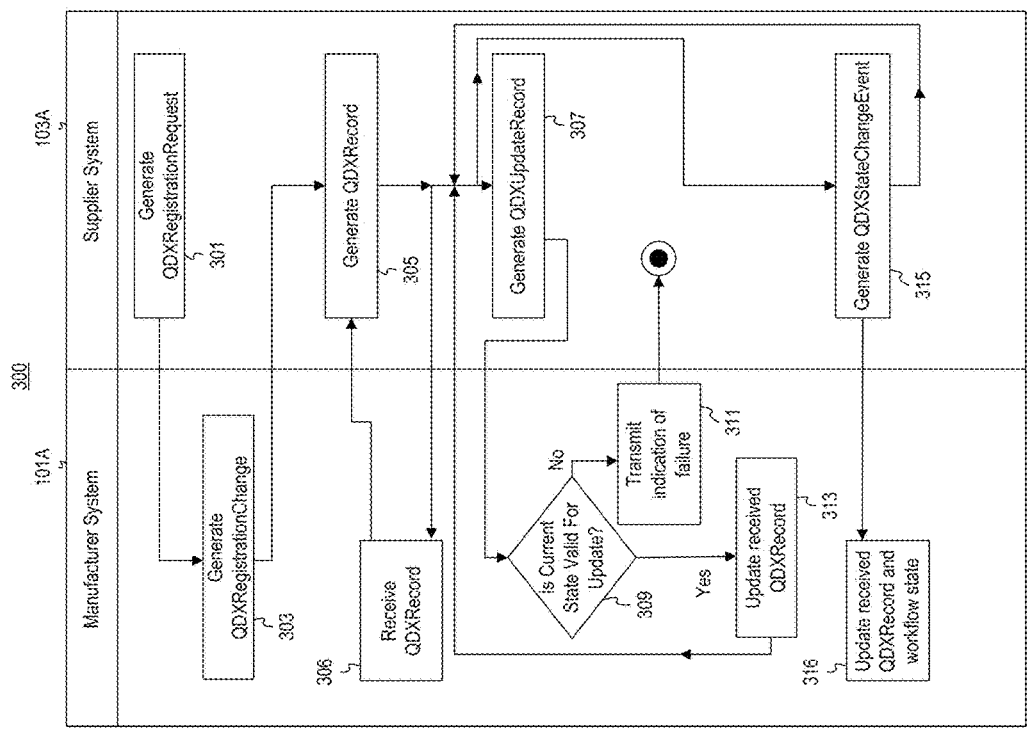
FIG. 3 illustrates an exemplary process flow for using the exemplary messages in FIG. 2, consistent with disclosed embodiments.

FIG. 3 illustrates an exemplary process 300 for using the exemplary messages in FIG. 2. Process 300 illustrates interactions between two systems, manufacturer system 101A and supplier system 103A. Continuing the above example, manufacturer 101 and supplier 103 are in a business relationship with one another, such that supplier 103 provides solid product A to manufacturer 101, and manufacturer 101 uses solid product A (along with products provided by suppliers 105, 107, 108, and 109) to create a pharmaceutical product.

In step 301, supplier system 103A sends a QDXRegistrationRequest message 201 to manufacturer system 101A. The QDXRegistrationRequest message 201 may include a request to initialize a connection between the systems. As explained above, QDXRegistrationRequest message 201 may include fields such as "joinOrganization" (representing an identifier for manufacturer 101 and/or supplier 103) and "project" (a title associated with the relationship, such as "Drug X—PharmaCo-Supplier A, Inc."). Manufacturer system 101A receives the QDXRegistrationRequest message 201 and processes it. If manufacturer system 101A determines that a connection should be established, then in step 303, manufacturer system 101A may send a QDXRegistrationChange message 203 to supplier system 103A, indicating that the connection has been established. The QDXRegistrationChange message 203 could include the "project" field from the QDXRegistrationRequest message 201.

Supplier 103 may determine that information needs to be sent to manufacturer 101. For example, during the production of solid product A, supplier 103 may receive information relating to the weight of one milliliter of the product, and may communicate that to manufacturer 101. In step 305, supplier system 103A can generate a new QDXRecord message 205, including the weight as one of the fields in that message, and send that message to manufacturer system 101A. In step 306, manufacturer system 101A can receive the new QDXRecord 205 and store the information therein, adjust its production workflow to account for the weight of solid product A, or take another action (e.g., contact supplier system 103A to request changes). Supplier system 103A can repeat and send one or more extra QDXRecord(s) 305 based on actions taken during the production of solid product A or other actions.

Supplier 103 may determine that the status of the earlier-sent QDXRecord needs to be changed. For example, supplier 103 may determine that the weight of solid product A has changed due to a change in the machinery used to produce it. Supplier 103 may also determine that the state of the workflow at manufacturer 101 should not change to account for this weight change. For example, if the weight of solid product A is merely a preliminary weight measurement sent to inform manufacturer 101 of progress in creating solid product A, manufacturer 101 may not need to change its workflow state to account for the change. In step 307, supplier system 103A may generate a QDXUpdateRecord message 209 which includes information related to the weight change. As indicated above, QDXUpdateRecord message 209 may also include a "targetStateName" element which indicates the name of a workflow state that manufacturer system 101A must be on in order to process QDXUpdateRecord message 209. For example, if the weight of solid product A is a preliminary measurement, supplier system 103A may indicate that the QDXUpdateRecord message 209 should only be processed if the workflow at manufacturer system 101A is still in a state where processing the updated preliminary weight will not affect manufacturer 101 (e.g., if manufacturer has not yet begun production).

In step 309, manufacturer system 101A receives the generated QDXUpdateRecord message 209 and determines whether the current state in its workflow matches that referenced in QDXUpdateRecord message 209. If manufacturer system 101A determines that the current state on its workflow matches the state referenced in QDXUpdateRecord message 209, then in step 313, manufacturer system 101A may update the earlier-received QDXRecord to account for the new weight information. However, if manufacturer system 101A is at a different state of the workflow from that indicated in QDXUpdateRecord message 209 (e.g., because the manufacturer's equipment is already configured to accept a particular weight of solid product A), manufacturer system 101A may send a communication indicating that it was unable to accept the QDXUpdateRecord message 209 to supplier system 103A.

Supplier 103 may also determine that the state of a workflow on manufacturer system 101A as well as data from an earlier-sent QDXRecord message 205 needs to be changed. For example, supplier 103 may determine that the chemical make-up of solid product A has changed due to a change in the materials used to produce it. Moreover, supplier 103 may determine that because the make-up of solid product A has changed, manufacturer 101 should recalibrate its machinery in order to account for the new composition, and that manufacturer 101 will need to change to a different state in the workflow at manufacturer system 101A (for example, to one that represents that manufacturer 101 is re-configuring its equipment).

In step 315, supplier system 103A may generate a QDXStateChangingEvent message 207 which includes information related to the change and the new state on the workflow at manufacturer system 101A. As explained above with reference to FIG. 2, QDXStateChangingEvent 207 may also include a "destinationStateName" element which indicates the name of a workflow state that manufacturer system 101A will change to upon receiving QDXStateChangingEvent 207. In step 316, manufacturer system 101A may receive QDXStateChangingEvent 207, update the associated earlier-received QDXRecord, and change the workflow state to the state referenced by the "destinationStateName" element in the received QDXStateChangingEvent 207.

As indicated in FIG. 3, after sending any of QDXRecord message 205, QDXUpdateRecord message 209, or QDXStateChangingEvent message 207, supplier system 103A may send any other messages as appropriate, based on the indications received from the workflow at its end. As an illustrative example, supplier 103 is attempting to reach a particular target weight for solid product A. Supplier system 103A may send an initial QDXRecord message 205 to manufacturer system 101A indicating the weight of solid product A during the initial attempts to get to that target weight. Manufacturer system 101A can receive the message and update its records. Supplier system 103A can send one or more QDXUpdateRecord message(s) 209 updating manufacturer 101 on the progress of reaching the target weight. Once supplier 103 reaches the target weight set by manufacturer 101, supplier system 103A may send a QDXStateChangingEvent message 207 to manufacturer 101A indicating that supplier 103 has reached the target weight and that the workflow at manufacturer 101 can change to a state related to production of the drug.

Figure 4:
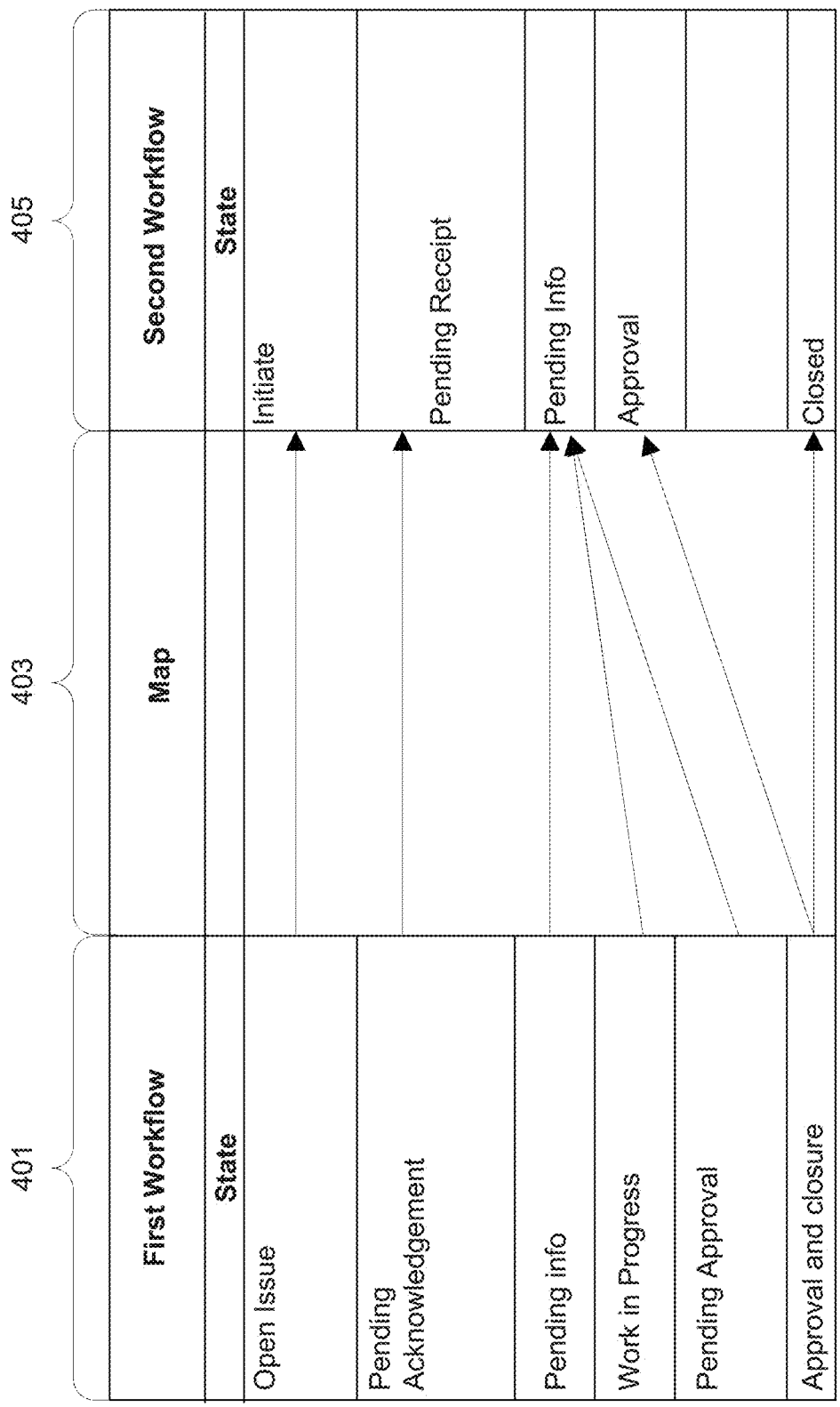
FIG. 4 illustrates an exemplary mapping of a first workflow to another workflow, consistent with disclosed embodiments.

FIG. 4 illustrates an exemplary mapping 403 of a first workflow 401 to another workflow 405. EQMSes may utilize workflows in order to manage the steps involved in a task. EQMSes may use workflows in order to manage a change request or an error condition during a production process. As an example, one EQMS (such as an EQMS at manufacturer system 101A) may utilize first workflow 401 while another EQMS (such as an EQMS at supplier 103A) may utilize second workflow 405.

As one illustrative example, if a manufacturer desires to change some parameter of the production process (e.g., the physical make-up of solid product A produced by a supplier), the manufacturer's system may utilize a workflow in order to manage the required change. For example, the "open issue" step may correspond to a period immediately before a communication is sent to the supplier that informs the supplier of the requested parameter change; "pending acknowledgement" may correspond to a time period after sending the communication and before the supplier acknowledges receipt; "pending info" may correspond to a time period during which the manufacturer is waiting to confirm that the requested parameter change is possible; "work in progress" may correspond to a time period during which the manufacturer is waiting for the supplier to effect the requested parameter change; "pending approval" may correspond to a time period during which the manufacturer is inspecting sample goods produced by the supplier following the parameter change (e.g., to determine if the change was made correctly); and "approval and closure" may correspond to the manufacturer sending a communication to the supplier that the parameter change was correctly made and that the supplier can begin producing solid product A with the new parameters.

Map 403 indicates a mapping created between workflows 401 and 405. As explained above with respect to FIG. 2, the states in two workflows may be mapped to one another in order for each EQMS to understand what state the other workflow is at. In some embodiments, each EQMS can maintain an individual map 403 which indicates a first step in that EQMS and one or more steps in a workflow in another EQMS that the first step is related to. In other embodiments, an adapter or connector (e.g., QDX Adapter 125A in FIG. 1B or adapters 513A or 513B in FIG. 5) may maintain a map 403. If two states are "mapped" to one another, one EQMS is able to determine that the state at which the other EQMS is at. In this illustrative embodiment, the "open issue" state in first workflow 401 is mapped to the "initiate" state in second workflow 405. Similarly, the "pending info" state in first workflow 401 maps to the "pending info" state in second workflow 405. The "work in progress" state and the "pending approval" state in first workflow 401 also map to the "pending info" state in second workflow 405, because these stages are the closest related states in each workflow.

Figure 5:
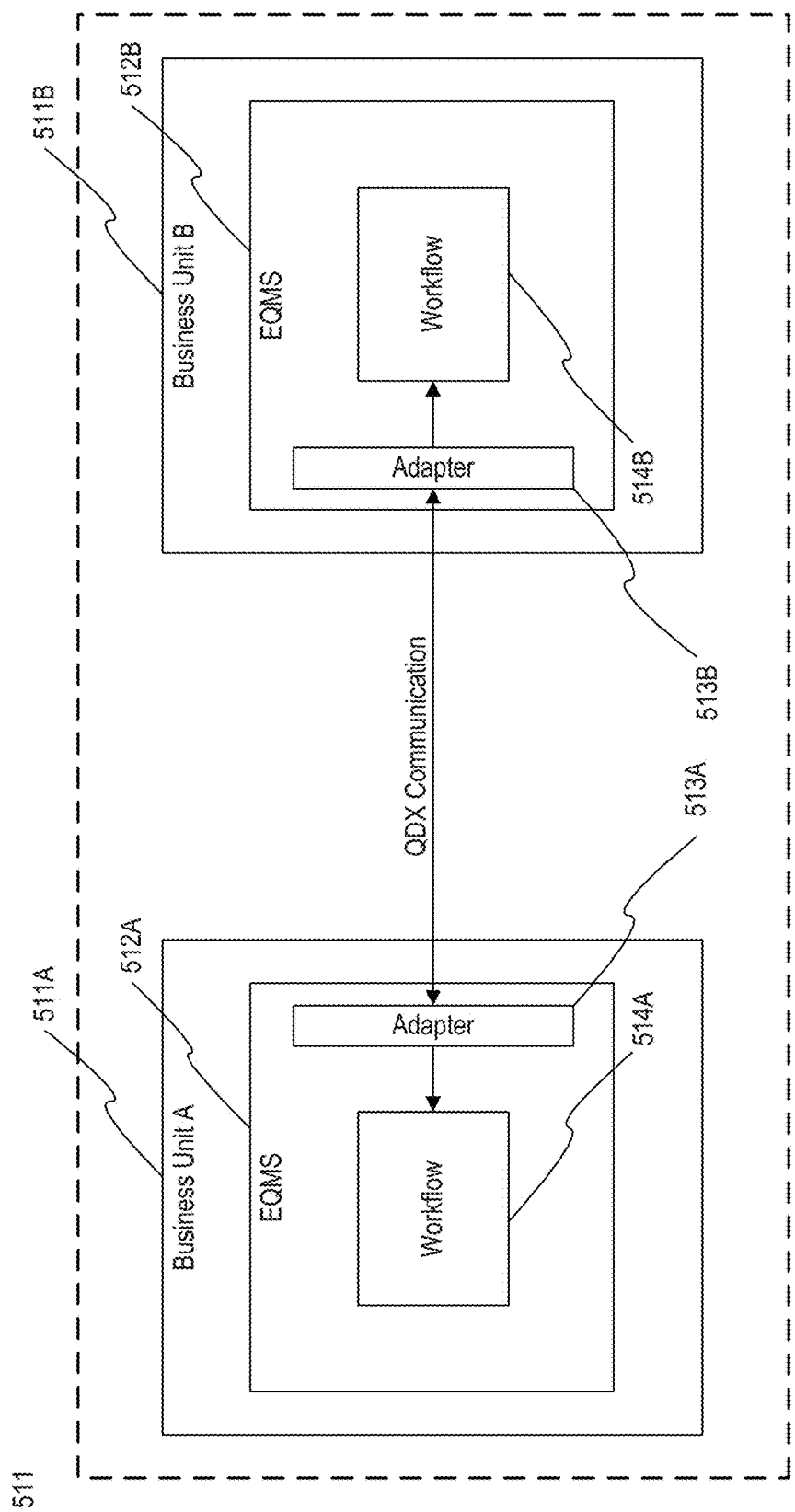
FIG. 5 illustrates an exemplary embodiment of EQMSes in communication with one another, consistent with disclosed embodiments.

FIG. 5 illustrates an exemplary embodiment 511 of EQMSes 512A and 512B in communication with one another, consistent with disclosed embodiments. Embodiment 511 includes exemplary EQMSes operated by two business units (511A, 511B) of one company, conglomerate, or business. Each of business units 511A and 511B has a respective EQMS system (512A, 512B). Each of EQMS 512A and 512B comprise an adapter for communicating information (513A, 513B) and a respective workflow (514A, 514B). In some situations, each of workflows 514A and 514B may be different from one another.

As one example, business unit 511A may be a company division that creates liquid insulin for diabetic patients, and business unit 511B may be a separate company division that manufactures devices to monitor patients' blood sugar. The devices manufactured by business unit 511B give the patient a blood sugar measurement and inform the patient how many doses are necessary to stay in compliance with the patient's insulin plan. Business unit 511B needs to know how much insulin is in each individual dose produced by business unit 511A so the device does not under-prescribe (or over-prescribe) insulin to the patient.

After changing the strength of each individual dose, EQMS 512A generates a change request communication. The change request communication includes, for example, a description of the changes made to the dosage at business unit 511A, the changes that should be made to the device produced by business unit 511B, or the like. EQMS 512A generates the change request using the language associated with EQMS 512A and workflow 514A, and sends the change request to adapter 513A. Adapter 513A receives the change request and converts the information in the change request to a common standard for information using communications (e.g., a QDXStateChangingEvent message 207). Adapter 513A sends the converted communication over a network (e.g., the Internet) to adapter 513B. Adapter 513B receives the converted message and determines whether or not to convert the communication into a different format. For example, if EQMS 512B cannot natively interpret QDX-based communications (e.g. QDXRecord 205, QDXStateChangingEvent 207, or QDXUpdateRecord 209), adapter 513B may convert the received communication into a form that EQMS 512B can natively interpret without filtering or converting. If EQMS 512B can natively interpret QDX-based communications, adapter 513B can send the received communication directly to 512B. EQMS 512B can then change state on workflow 514B.

Figure 6:
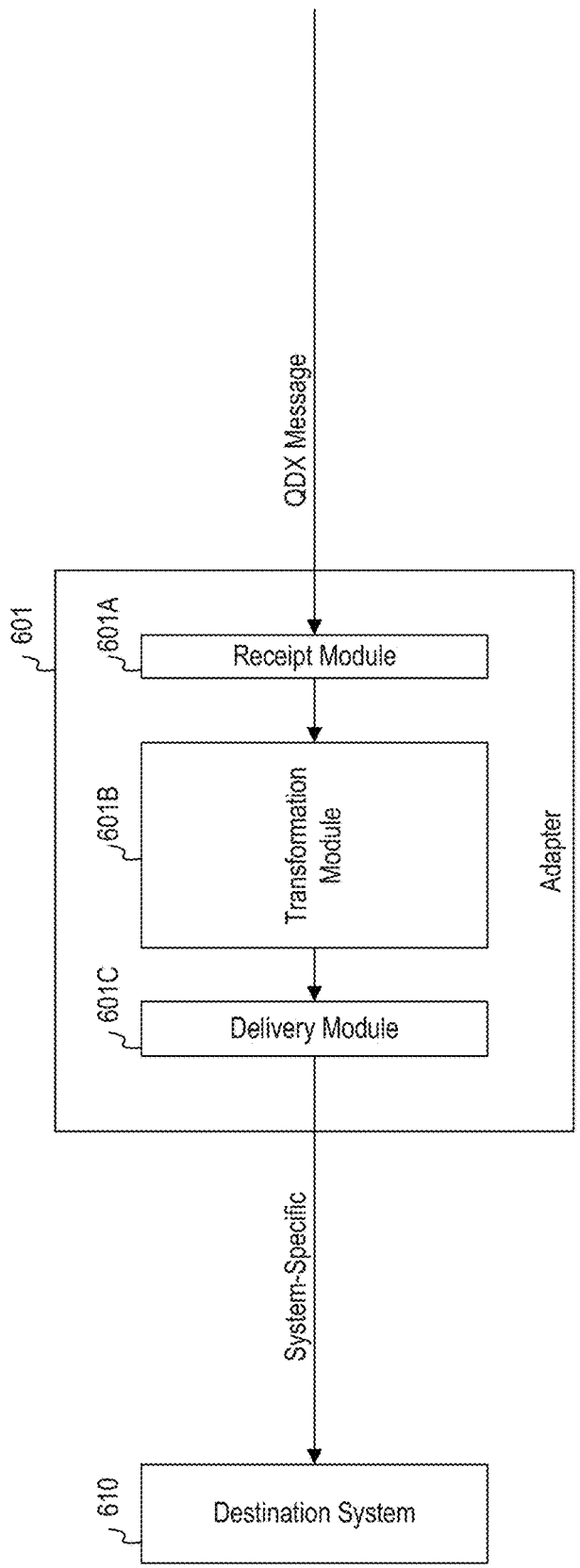
FIG. 6 illustrates an exemplary storage module, EQMSes, and adapter, consistent with disclosed embodiments

FIG. 6 illustrates an exemplary storage module 621, EQMS 623, EQMS 610, and adapter 625, consistent with disclosed embodiments. Each of storage module 621, EQMS 623, EQMS 610, and adapter 625 may be implemented as one or more systems, devices, software, firmware, hardware, or a combination thereof.

Storage module 621 may be implemented as a system for storing quality data and/or communications received from one or more EQMSes. Storage module 621 may be implemented as, for example, a distributed database management system or a stand-alone database. Examples of databases include Cassandra, NoSQL, MySQL, and Oracle, but a particular database is not necessarily required in all embodiments.

EQMS 623 may be implemented as one or more devices operable to receive communications (such as quality information) from one or more other devices (such as EQMSes). EQMS 623 includes resources 623A, receipt procedure 623B, and client 623C.

Resources 623A may be configured to receive quality information and/or other data from Adapter 625. Adapter 625 is an example of a combined embedded publish and subscribe component. It publishes data to EQMS 623 with native QDX support using the QDX format, and polls from storage module 621 to read pending messages.

Receipt procedure 623B may be implemented as one or more systems or methods for receiving quality information from resources 623A. For example, receipt procedure may receive one or more of the messages in FIG. 2 from resources 623A. Receipt procedure 623B may be configured to process received information and send it to client 623C.

Client 623C may be configured to receive quality information and send it to storage module 621. For example, client 623C may send quality information to storage module 621 using HTTP, JSON, or any other protocol for sending information over a network.

Adapter 625 may include SOAP endpoints 601D, publish module 601F, and read module 601G. Adapter 625 may be configured to poll storage module 621 for quality information that EQMS 610 has subscribed to receive. For example, EQMS 610 may subscribe to quality information related to a particular project, and may send an instruction to read module 601G to poll storage module 621 for quality information related to that project. Read module 601G may poll storage module 621 for messages on any basis—such as once per minute, once per hour, or once per day, or may request that storage module 621 notify it when storage module 621 receives quality information related to a subscription associated with EQMS 610. If adapter 625 receives quality information from storage module 621, adapter 625 may forward it to EQMS 610.

SOAP endpoints 601D may be implemented as one or more endpoints (e.g., URLs) that EQMS 610 may utilize for communicating with adapter 625. SOAP endpoints 601D may be implemented as one or more network endpoints that define a specification for enabling other systems to send information to a system or receive information from the system. For example, EQMS 610 may send quality information (e.g., one or more of the messages in FIG. 2) to adapter 625 using SOAP endpoints 601D, in a format defined by one of SOAP endpoints 601D. SOAP endpoints 601D may receive the quality information in a particular format defined by one or more SOAP endpoints 601D, and send that information to publish module 601F.

Publish module 601F may request updates from EQMS 610. For example, if a user using EQMS 610 generates new quality information, publish module 601F may determine whether or not the information received from SOAP endpoints 601D is properly synchronized with the information stored in EQMS 610. To do so, synchronization module 601F may send a request to SOAP endpoints 601D, requesting verification that the information at publish module 601F is the most recent information related to EQMS 610. (For example, publish module 601F may send a timestamp for the most recently received message received from EQMS 610.) Whatever the outcome of this comparison, publish module 601F may send the most up-to-date information to EQMS 623.

In some embodiments, interconnection system 120 in FIG. 1B may be implemented using the components illustrated in FIG. 6 (e.g., instead of or in addition to the components illustrated in FIG. 1B).

Figure 7:
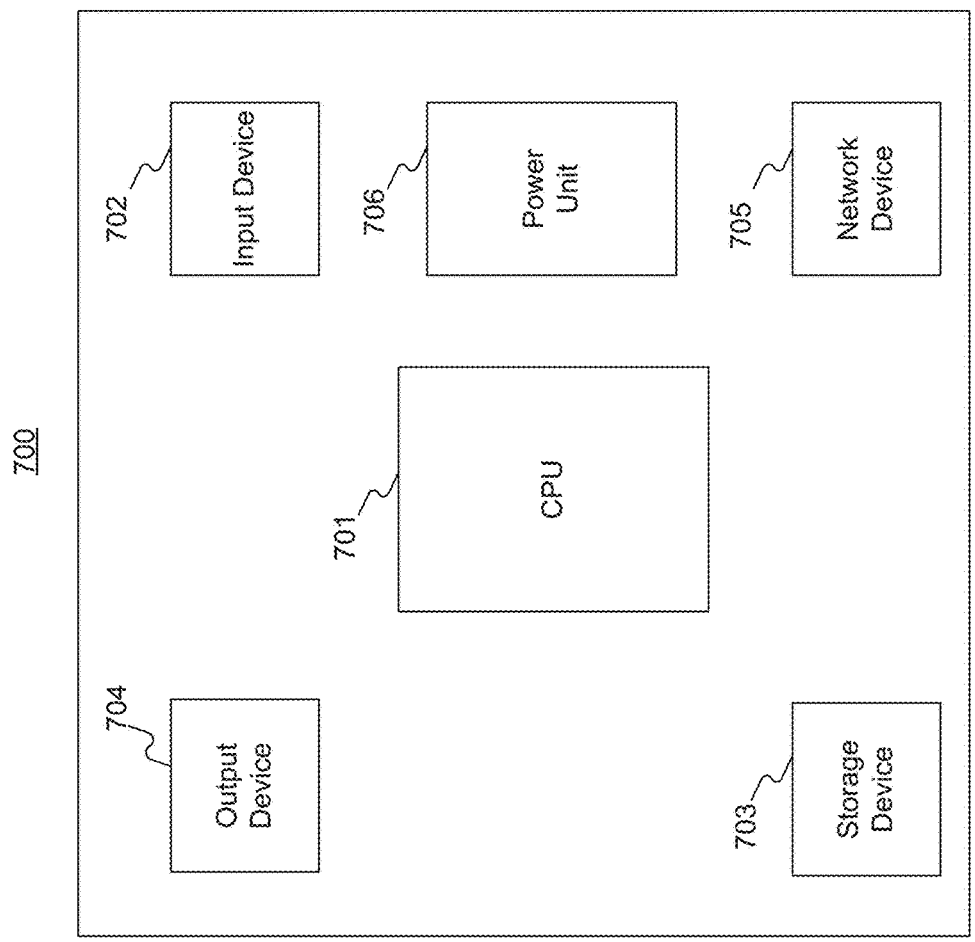
FIG. 7 illustrates an exemplary computing device, consistent with disclosed embodiments.

FIG. 7 illustrates an exemplary computing device 700, consistent with disclosed embodiments. Variations of computing device 700 may be used for implementing any or all of manufacturer system 101A or supplier systems 103A, 105A, 107A, 108A, or 109A in FIG. 1A, interconnection system 120 in FIG. 1B, EQMSes 512A or 512B in FIG. 5, storage module 621, EQMSes 610 or 623, or adapter 625 in FIG. 6, or other systems or devices in this disclosure. While the modules in FIG. 7 are represented in a singular form, in some embodiments, each of the devices in FIG. 7 may be omitted, duplicated, or substituted.

As shown in FIG. 7, exemplary computer device 700 may include central processing unit (CPU) 701 for managing and processing data and operations consistent with the disclosed embodiments. CPU 701 may be configured to process data, execute software instructions stored in memory, and transmit data between the other components of device 700. For example, CPU 701 may be implemented as a mobile microprocessor, a desktop microprocessor, a server microprocessor, or any other type of electronic processor.

In some embodiments, computing device 700 also includes input device 702, which are configured to receive input from a user, other computers, other devices, or other modules. Input device 702 includes one or more of keyboards, mice, trackballs, trackpads, scanners, cameras, external storage or information devices, and other devices. Input device 702 may be implemented as an integral part of computing device 700 or may be connected to computing device 700 using one or more connections, such as Universal Serial Bus (USB), serial, parallel, infrared, or other wireless or wired connections.

Computing device 700 may also include storage device 703. Storage device 703 includes one or more of optical memory, magnetic memory, signal memory, or any other type of memory configured to store information. Storage device 703 stores, for example, data, instructions, programs/applications, operating systems, or a combination thereof.

Computing device 700 also includes output device 704, configured to transmit data to users and/or modules or devices. Output device 704 includes one or more of computer monitors, televisions, screens, interface ports, projectors, printers, plotters. Output device 704 may be implemented as an integral part of computing device 700 or may be connected to computing device 700 using one or more connections, such as Universal Serial Bus (USB), serial, parallel, infrared, or other wireless or wired connections.

Computing device 700 may also include network device 705. Network device 705 is configured to allow computer device 700 to connect to and exchange information with one or more networks, such as the Internet, a local area network, a wide area network, a cellular network, a wireless network, or any other type of network. Network device 705 may be implemented as a wired network adapter, a wireless network adapter, an infrared network adapter, a cellular or satellite network adapter, or any other type of network adapter. Network device 705 may be implemented as an integral part of computing device 700 or may be connected to computing device 700 using one or more connections, such as Universal Serial Bus (USB), serial, parallel, infrared, or other wireless or wired connections.

Computing device 700 may also include power unit 706, configured to enable computer device 700 and its components to receive power and operate. Power unit 706 may be implemented as a battery, power supply, or the like.

Each component in computing device 700 (e.g., CPU 701, input device 702, storage device 703, output device 704, network device 705, and power unit 706) may be connected to one another using one or more connections, such as a bus (not pictured). The components may be connected to one another to enable data transmission between the components or the powering of components.

Various embodiments have been described with reference to the accompanying drawings and embodiments. It will, however, be evident that various modifications and changes may be made thereto, and additional embodiments may be implemented, without departing from the present disclosure. The specification and drawings are accordingly to be regarded in an illustrative rather than restrictive sense.

For example, advantageous results may still be achieved if steps of the disclosed methods were performed in a different order and/or if components in the disclosed systems were combined in a different manner and/or replaced or supplemented by other components. Advantageous results may still be achieved if values or data were different than explicitly disclosed. Other implementations are also within the scope of the present disclosure.

The term "computer system" is intended to encompass both a single computer (e.g. the device described above with respect to FIG. 7) and multiple computers acting in tandem or cooperation with one another (e.g., parallel processing, computer clustering, or the like).

It is to be understood that both the foregoing general description and the following detailed description are exemplary and explanatory only and are not restrictive of the disclosed embodiments, as claimed. Note also that, as used herein, the indefinite articles "a" and "an" mean "one or more" in open-ended claims containing the transitional words "comprising," "including," and/or "having."

The accompanying drawings, which are incorporated in and constitute a part of this specification, illustrate one or more embodiments and together with the description, serve to explain certain aspects of the disclosed embodiments.

Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method executed by a first adapter on a first computer system for data interchange on a computer network, the method comprising:

receiving, by the first adapter, a first Enterprise Quality Management (EQM) communication configured to pass EQM data between the first computer system and a second computer system on the computer network, the first EQM communication being generated by the first computer system;

transforming, by the first adapter, the EQM communication into a standardized data format;

transmitting, by the first adapter, the standardized first EQM communication to a second adapter resident on a second computer system, wherein the second adapter is configured to receive network communications addressed to the second computer system, determine whether each network communication is interpretable by the second computer system, and further transform each network communication that is not interpretable by the second computer system into a data format interpretable by the second computer system;

receiving, by the first adapter, a second EQM communication comprising EQM response data from the second adapter in response to the first EQM communication, the second EQM communication being transmitted by the second adapter in the standardized data format;

determining, by the first adapter, whether the second EQM communication is interpretable by the first computer system; and transforming, by the first adapter, the second EQM communication into a data format interpretable by the first computer system based at least in part on a determination that the second EQM communication is not interpretable by the second computer system.

2. The method of claim 1, wherein the EQM communication is an asynchronous network communication.

3. The method of claim 1, wherein at least one of the first computer system or the second computer system is an EQM computer system.

4. The method of claim 1, wherein the second EQM communication is generated by the second computer system and transformed into the standardized data format by the second adapter.

5. The method of claim 1, wherein the first EQM communication comprises a registration request communication configured to initialize a connection between the first computer system and the second computer system and wherein the EQM data comprises one or more data elements associated with a business relationship between the first computer system and the second computer system.

6. The method of claim 5, wherein the second EQM communication comprises a registration change communication configured to indicate a result of the registration request communication and wherein the response EQM data comprises one or more of: a confirmation of at least one of the one or more data elements associated with the business relationship between the first computer system and the second computer system or a modification of at least one of the one or more data elements associated with the business relationship between the first computer system and the second computer system.

7. The method of claim 1, wherein the first EQM communication comprises one or more of: a record communication comprising an object quality record of an object associated with a business relationship between the first computer system and the second computer system or an update communication comprising an update to the object quality record.

8. The method of claim 1, wherein the first EQM communication comprises a state change communication comprising a state of a first EQM workflow executing at the first computer system and wherein the data interconnection system is further configured to translate the state of the first EQM workflow into a corresponding state of a second EQM workflow executing at the second computer system.

9. The method of claim 8, wherein the second EQM communication comprises a state change communication comprising a state of a second EQM workflow executing at the second computer system and wherein the data interconnection system is further configured to translate the state of the second EQM workflow into a corresponding state of a first EQM workflow executing at the first computer system.

10. The method of claim 1, wherein the EQM data comprises one or more of: an object quality record of an object associated with a business relationship between the first computer system and the second computer system; an update to the object quality record; an identifier of the object quality record; a relationship identifier corresponding to a relationship between the first computer system and the second computer system; a state of an EQM workflow executing on the first computer system; contact information associated with the first computer system; or identification information associated with the first computer system.

11. A first adapter on a first computer system for data interchange on a computer network, the first adapter comprising:

one or more processors; and one or more memories operatively coupled to at least one of the one or more processors and having instructions stored thereon that, when executed by at least one of the one or more processors, cause at least one of the one or more processors to:

receive a first Enterprise Quality Management (EQM) communication configured to pass EQM data between the first computer system and a second computer system on the computer network, the first EQM communication being generated by the first computer system;

transform the EQM communication into a standardized data format;

transmit the standardized first EQM communication to a second adapter resident on a second computer system, wherein the second adapter is configured to receive network communications addressed to the second computer system, determine whether each network communication is interpretable by the second computer system, and further transform each network communication that is not interpretable by the second computer system into a data format interpretable by the second computer system;

receive a second EQM communication comprising EQM response data from the second adapter in response to the first EQM communication, the second EQM communication being transmitted by the second adapter in the standardized data format;

determine whether the second EQM communication is interpretable by the first computer system; and transform the second EQM communication into a data format interpretable by the first computer system based at least in part on a determination that the second EQM communication is not interpretable by the second computer system.

12. The first computer system of claim 11, wherein the EQM communication is an asynchronous network communication.

13. The first computer system of claim 11, wherein at least one of the first computer system or the second computer system is an EQM computer system.

14. The first computer system of claim 11, wherein the second EQM communication is generated by the second computer system and transformed into the standardized data format by the second adapter.

15. The first computer system of claim 11, wherein the first EQM communication comprises a registration request communication configured to initialize a connection between the first computer system and the second computer system and wherein the EQM data comprises one or more data elements associated with a business relationship between the first computer system and the second computer system.

16. The first computer system of claim 15, wherein the second EQM communication comprises a registration change communication configured to indicate a result of the registration request communication and wherein the response EQM data comprises one or more of: a confirmation of at least one of the one or more data elements associated with the business relationship between the first computer system and the second computer system or a modification of at least one of the one or more data elements associated with the business relationship between the first computer system and the second computer system.

17. The first computer system of claim 11, wherein the first EQM communication comprises one or more of: a record communication comprising an object quality record of an object associated with a business relationship between the first computer system and the second computer system or an update communication comprising an update to the object quality record.

18. The first computer system of claim 11, wherein the first EQM communication comprises a state change communication comprising a state of a first EQM workflow executing at the first computer system and wherein the data interconnection system is further configured to translate the state of the first EQM workflow into a corresponding state of a second EQM workflow executing at the second computer system.

19. The first computer system of claim 18, wherein the second EQM communication comprises a state change communication comprising a state of a second EQM workflow executing at the second computer system and wherein the data interconnection system is further configured to translate the state of the second EQM workflow into a corresponding state of a first EQM workflow executing at the first computer system.

20. The first computer system of claim 11, wherein the EQM data comprises one or more of: an object quality record of an object associated with a business relationship between the first computer system and the second computer system; an update to the object quality record; an identifier of the object quality record; a relationship identifier corresponding to a relationship between the first computer system and the second computer system; a state of an EQM workflow executing on the first computer system; contact information associated with the first computer system; or identification information associated with the first computer system.

21. At least one non-transitory computer-readable medium storing computer-readable instructions that, when executed by a first adapter on a first computer system, cause the first adapter to:
receive a first Enterprise Quality Management (EQM) communication configured to pass EQM data between the first computer system and a second computer system on the computer network, the first EQM communication being generated by the first computer system;
transform the EQM communication into a standardized data format;
transmit the standardized first EQM communication to a second adapter resident on a second computer system, wherein the second adapter is configured to receive network communications addressed to the second computer system, determine whether each network communication is interpretable by the second computer system, and further transform each network communication that is not interpretable by the second computer system into a data format interpretable by the second computer system;
receive a second EQM communication comprising EQM response data from the second adapter in response to the first EQM communication, the second EQM communication being transmitted by the second adapter in the standardized data format;
determine whether the second EQM communication is interpretable by the first computer system; and
transform the second EQM communication into a data format interpretable by the first computer system based at least in part on a determination that the second EQM communication is not interpretable by the second computer system.

22. The at least one non-transitory computer-readable medium of claim 21, wherein the EQM communication is an asynchronous network communication.

23. The at least one non-transitory computer-readable medium of claim 21, wherein at least one of the first computer system or the second computer system is an EQM computer system.

24. The at least one non-transitory computer-readable medium of claim 21, wherein the second EQM communication is generated by the second computer system and transformed into the standardized data format by the second adapter.

25. The at least one non-transitory computer-readable medium of claim 21, wherein the first EQM communication comprises a registration request communication configured to initialize a connection between the first computer system and the second computer system and wherein the EQM data comprises one or more data elements associated with a business relationship between the first computer system and the second computer system.

26. The at least one non-transitory computer-readable medium of claim 25, wherein the second EQM communication comprises a registration change communication configured to indicate a result of the registration request communication and wherein the response EQM data comprises one or more of: a confirmation of at least one of the one or more data elements associated with the business relationship between the first computer system and the second computer system or a modification of at least one of the one or more data elements associated with the business relationship between the first computer system and the second computer system.

27. The at least one non-transitory computer-readable medium of claim 21, wherein the first EQM communication comprises one or more of: a record communication comprising an object quality record of an object associated with a business relationship between the first computer system and the second computer system or an update communication comprising an update to the object quality record.

28. The at least one non-transitory computer-readable medium of claim 21, wherein the first EQM communication comprises a state change communication comprising a state of a first EQM workflow executing at the first computer system and wherein the data interconnection system is further configured to translate the state of the first EQM workflow into a corresponding state of a second EQM workflow executing at the second computer system.

29. The at least one non-transitory computer-readable medium of claim 28, wherein the second EQM communication comprises a state change communication comprising a state of a second EQM workflow executing at the second computer system and wherein the data interconnection system is further configured to translate the state of the second EQM workflow into a corresponding state of a first EQM workflow executing at the first computer system.

30. The at least one non-transitory computer-readable medium of claim 21, wherein the EQM data comprises one or more of: an object quality record of an object associated with a business relationship between the first computer system and the second computer system; an update to the object quality record; an identifier of the object quality record; a relationship identifier corresponding to a relationship between the first computer system and the second computer system; a state of an EQM workflow executing on the first computer system; contact information associated with the first computer system; or identification information associated with the first computer system.

* * * * *